US012774130B1

(12) United States Patent
Dunn

(10) Patent No.: US 12,774,130 B1
(45) Date of Patent: Oct. 27, 2026

(54) DISPLAY ASSEMBLIES WITH INCORPORATED LIFT BOXES

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/388,359

(22) Filed: Nov. 13, 2025

Related U.S. Application Data

(63) Continuation of application No. 18/971,795, filed on Dec. 6, 2024, now Pat. No. 12,492,039.

(60) Provisional application No. 63/611,591, filed on Dec. 18, 2023.

(51) Int. Cl.

| | |
|---|---|
| ***B65D 19/38*** | (2006.01) |
| ***B65D 19/00*** | (2006.01) |
| ***G06F 1/16*** | (2006.01) |

(52) U.S. Cl.
CPC ......... *B65D 19/38* (2013.01); *B65D 19/0012* (2013.01); *G06F 1/1601* (2013.01); *B65D 2519/00328* (2013.01)

(58) Field of Classification Search
CPC ................ B65D 19/38; B65D 19/0012; B65D 2519/00328; G06F 1/1601
See application file for complete search history.

(56) References Cited

U.S. PATENT DOCUMENTS

| | | | | |
|---|---|---|---|---|
| 9,823,690 | B2 * | 11/2017 | Bowers | H04M 17/026 |
| 11,919,393 | B2 * | 3/2024 | Dunn | B60L 1/00 |
| 11,997,808 | B2 * | 5/2024 | Dunn | H02J 7/70 |
| 12,010,813 | B2 * | 6/2024 | Dunn | B60L 53/302 |

* cited by examiner

*Primary Examiner* — Anita M King
(74) *Attorney, Agent, or Firm* — Standley Law Group LLP; Jeffrey S. Standley; Adam J. Smith

(57) ABSTRACT

Display assemblies with an incorporated lift box are disclosed, along with related systems and methods. The display assembly includes a common structure including and/or forming the lift box in a base thereof. An electronic display subassembly is connected to the common structure and includes a cover layer and an electronic display layer. Two such display assemblies may be arranged at a common surface such that an open end of the lift boxes faces in an at least substantially same direction. Forks of a forklift or pallet jack may be moved into the lift boxes for transporting the display assemblies together.

18 Claims, 4 Drawing Sheets

DISPLAY ASSEMBLIES WITH INCORPORATED LIFT BOXES

CROSS-REFERENCE TO RELATED APPLICATIONS

This application is a continuation of U.S. application Ser. No. 18/971,795 filed Dec. 6, 2024, which claims the benefit of U.S. provisional patent application Ser. No. 63/611,591 filed Dec. 18, 2023, the disclosures of which are hereby incorporated by reference as if fully restated herein.

TECHNICAL FIELD

Exemplary embodiments relate generally to display assemblies with incorporated lift boxes and systems and methods related to the same.

BACKGROUND AND SUMMARY OF THE INVENTION

Digital out of Home ("DOOH") advertising is becoming increasingly popular. DOOH advertising units include an electronic display, typically at least partially enclosed within a ruggedized housing. This may help the units withstand various environmental conditions such as severe weather, solar loading, user interactions, and the like. Examples of such DOOH units include the BOLDVU® product available from Manufacturing Resources International, Inc. of Alpharetta Georgia (mri-inc.net).

These DOOH units may be relatively large display assemblies which are configured for mounting to a sidewalk, wall, or other surface. Sometimes, such display assemblies (fully or partially assembled) require shipping relatively long distances, such as across an ocean and/or to one or more different countries or continents, for final delivery and/or installation. Sometimes the display assemblies must be placed into a shipping container or other transportation medium for transport on a vehicle such as a cargo ship, airplane, railway, flatbed truck, combinations thereof, or the like. Sometimes transportation requires multiple transportation vehicles and/or media, with intermediary transportation, loading, and/or unloading, for example. Regardless, it is desirable to efficiently pack such display assemblies when shipping, such as to maximize available space for shipping display assemblies or other items.

These display assemblies (hereinafter also sometimes "units") are relatively large and heavy. Thus, it may be desirable to accomplish further transportation (e.g., loading, unloading, movement) by intermediary vehicle such as a forklift and/or pallet jack (manual or autonomous) for example.

Display assemblies which include incorporated lift boxes are provided. Such units may each include a lift box located at a lower portion of the unit, such as at a bottom portion of a structural framework. Two display assemblies may be aligned, such as by mounting to a common surface to face in a first common direction, such that openings in the lift boxes are aligned in a second common direction to receive forks of an intermediary transportation vehicle (e.g., forklift and/or pallet jack). This may provide ease of transportation and/or efficient packing.

The lift boxes may form part of a base for the units, which may elevate the structural framework and/or electronic display subassemblies of the units from a ground or other surface when the units are installed. The bases may be used for installation of the units, such as at a sidewalk, parking lot, or other ground surface, for example. In this way, the lift boxes may serve multiple purposes and/or be integrated with the units.

In exemplary embodiments, each of the units comprise a first, forward facing electronic display subassembly and a second, rearward facing electronic display subassembly. Each of the lift boxes in such embodiments may be located at least partially between the first and second electronic display subassemblies for the units and include an opening which faces in a common direction. Additional equipment (e.g., electric vehicle chargers, thermal management equipment, computer equipment, wireless communications equipment, combinations thereof, or the like) may also be provided at the units.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
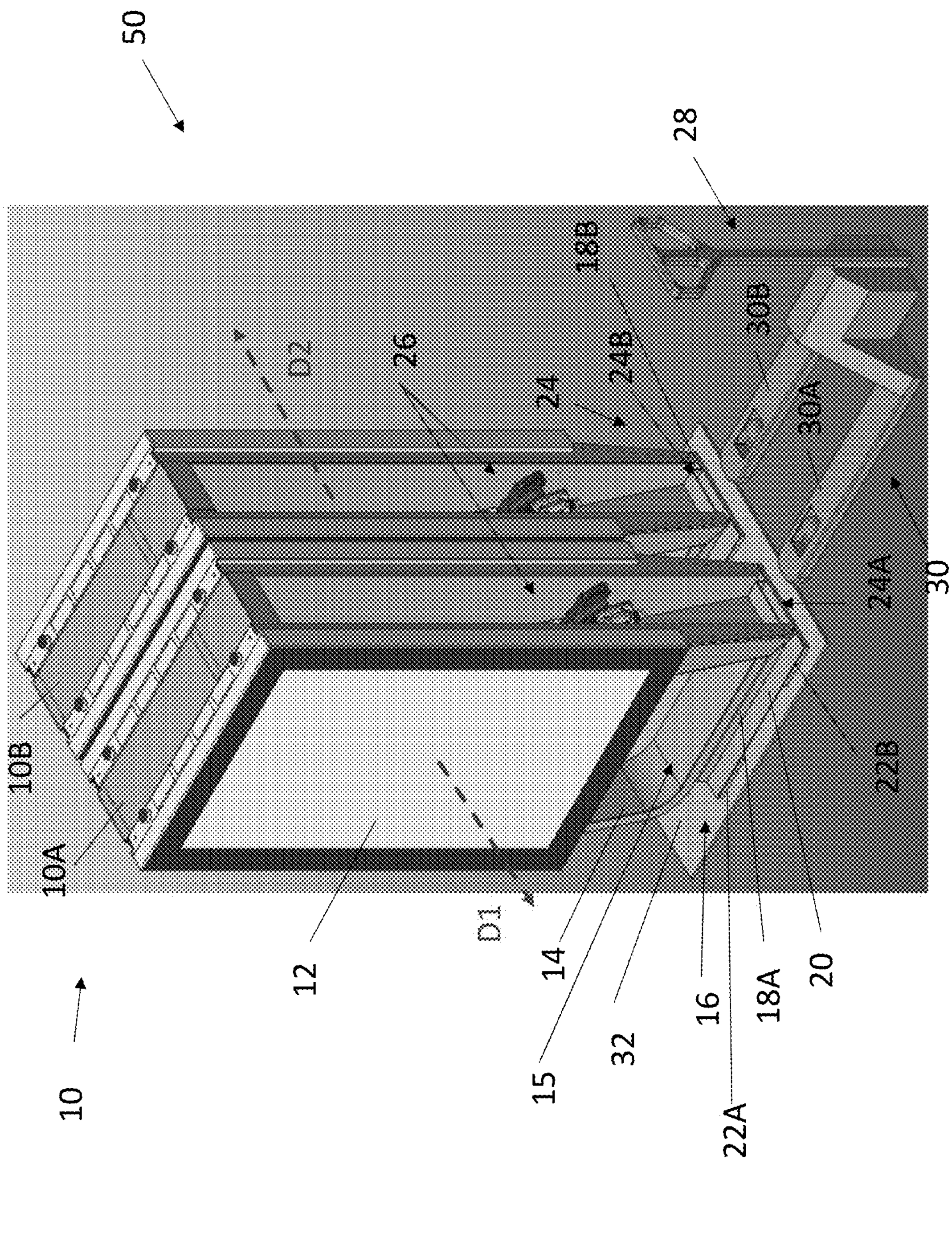
FIG. 1 is a perspective view of two exemplary units mounted at a common surface in an exemplary configuration with an approaching, exemplary pallet jack.
Figure 2:
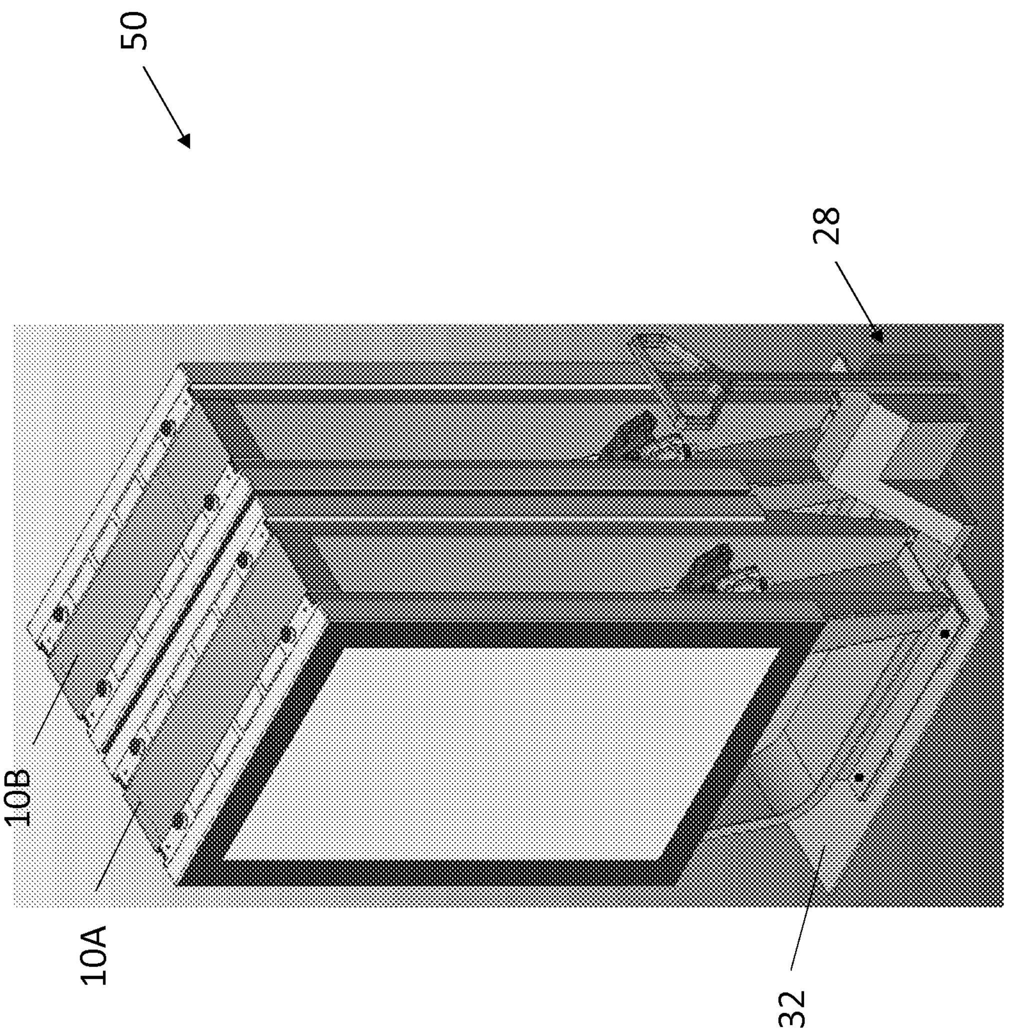
FIG. 2 is the perspective view of FIG. 1 with forks of the pallet jack inserted into lift boxes of the units for transportation.
Figure 3:
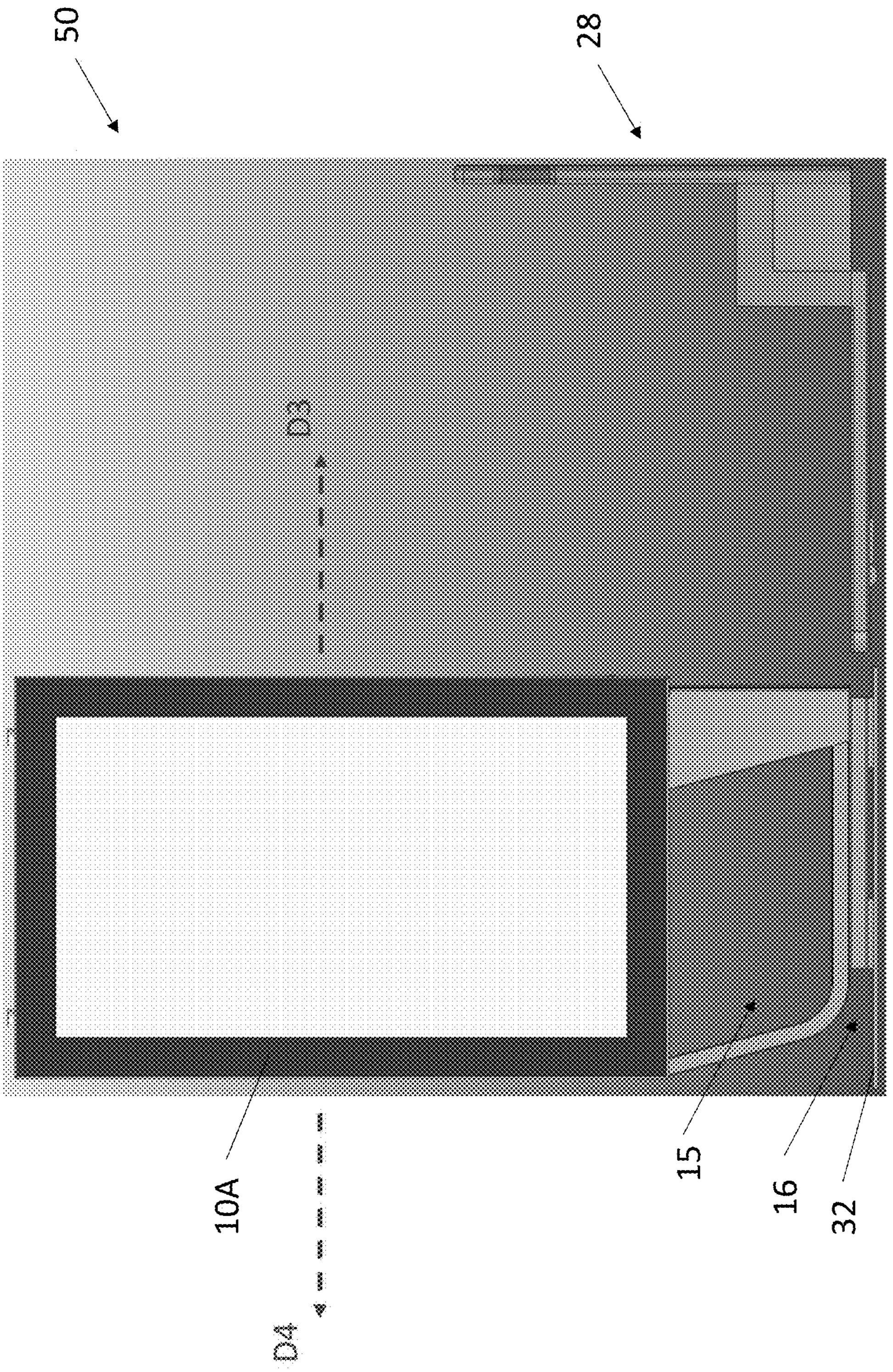
FIG. 3 is a front view of the FIG. 1 embodiment.
Figure 4:
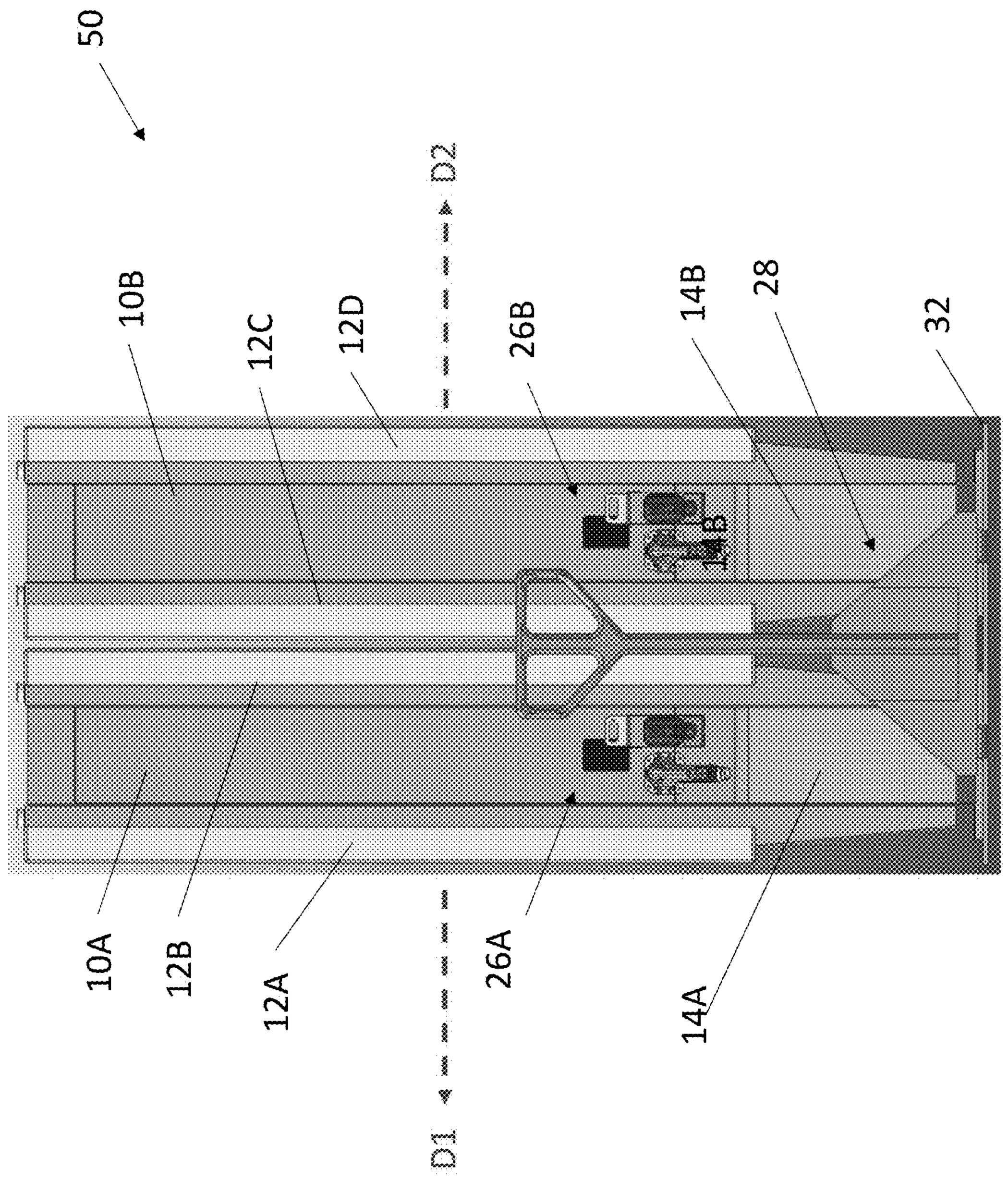
FIG. 4 is a right-side view of the FIG. 1 embodiment.

FIG. 1 through FIG. 4 illustrate an exemplary transportation system 50 for display assemblies 10. Individual ones of the display assemblies 10 may be referred to herein with a letter modifier, e.g., 10A, 10B. The transportation system 50 may be used to transport multiple display assemblies 10, preferably provided in pairs, more preferably two display assemblies 10, without limitation. The units 10, in exemplary embodiments without limitation, may include those available from Manufacturing Resources International, Inc. of Alpharetta Georgia (mri-inc.net) and/or components thereof. For example, without limitation, the units 10 may comprise BOLDVU® displays, which may form the display subassemblies 12, at least in part, and/or part of, or all of, the units 10.

The display assemblies 10 may each comprise one or more electronic display subassemblies 12. The electronic display subassemblies 12 may be attached to a common structure 14. The common structure 14 of a respective one of the display assemblies 10 may be referred to herein with a letter modifier, e.g., 14A, 14B. Each of the electronic display subassemblies 12 may comprise an electronic display layer (e.g., liquid crystal, OLED), a cover layer(s), a backlight (direct or edge lit), optical films or layers (e.g., polarizers, anti-reflection films or coatings, dual brightness enhancement films, combinations thereof, or the like), combinations thereof, or the like.

The units 10 may comprise additional equipment 26 such as, but not limited to, electric vehicle charging equipment, touch screens, telephonic equipment, video communication equipment, cameras, sensors, thermal management subassemblies (e.g., airflow pathways, fans, heat exchangers, air conditioners, filters, combinations thereof, or the like), communications equipment (e.g., radio equipment, wireless routers, modems, combinations thereof, or the like), servers, computing devices, combinations thereof, or the like. Some or all of such equipment 26 and/or components thereof, may be located internal to, and/or external to, said structure 14. The equipment 26 of a respective one of the display assemblies 10 may be referred to herein with a letter modifier, e.g., 26A, 26B.

The structure 14 may comprise one or more members, housings, cladding, struts, combinations thereof, or the like. The structure 14 may provide a structural framework for supporting and/or protecting the electronic display subassemblies 12 and/or the additional equipment 26. At least the electronic display subassemblies 12 may be mounted to the structure 14 in a manner which permits the subassemblies 12 to be moved outward, such as for accessing a rear of the subassemblies 12 and/or interior of the units 10, including for example without limitation, the additional equipment 26 (e.g., for servicing, repair, replacement, etc.).

The units 10 may each comprise multiple electronic display assemblies 12A-D. Each unit 10 may comprise electronic display assemblies 12 positioned on either side of the structure 14, such as to face in different, preferably opposing, directions. Other size, shape, number, and/or arrangement of electronic display assemblies 12 may be utilized.

The units 10 may comprise a base 16. The base 16 may be part of the structure 14 (e.g., forming a lower portion thereof). The base 16 may support a remaining portion of the structure 14 and/or unit 10 from a ground or other surface.

The units 10 may optionally comprise an open area 15. In exemplary embodiments, without limitation, the open area 15 may be located at a lower portion of the structure 14, such as below the electronic display subassembly(ies) 12 and above the base 16 of a given unit 10. This may allow for airflow and/or visual sightlines through the unit 10. The open area 15 may be entirely unobstructed in exemplary embodiments.

Multiple units 10 may be mounted to a common surface 32, such as for transportation, packaging, and/or shipping purposes. In exemplary embodiments, without limitation, the units 10 are mounted to a given common surface 32 in one or more pairs, preferably two units 10 to a given common surface 32. The common surface 32 may comprise a metal plate, for example. Mounting may be accomplished by bolting or other temporary fastening, for example.

Each of the units 10 may comprise a lift box 18. Individual ones of the lift boxes 18 may be referred to herein with a letter modifier, e.g., 18A, 18B. In exemplary embodiments, the lift boxes 18 form part of the base 16 and/or structure 14. Preferably, each of the lift boxes 18 form part of and/or are provided in one of the bases 16. Each of the bases 16 may comprise a platform 20. The platform 20 may form part of the lift box 18 or be separate therefrom. One or more feet 22 may optionally extend from the platform 20. For example, front and rear feet 22A, 22B may be provided for each unit 10. Any number and/or arrangement of feet 22 may be provided.

Each of the lift boxes 18 may comprise an opening 24. Preferably, each of the lift boxes 18 has a single opening 24 on one end thereof. However, each of the lift boxes 18 may have multiple openings 24, such as on either end thereof. Individual ones of the openings 24 may be referred to herein with a letter modifier, e.g., 24A, 24B. The lift boxes 18 may each comprise a cuboid shaped void.

The openings 24 may be configured to receive forks 30 of an intermediary transportation vehicle 28. Individual ones of the forks 30 may be referred to herein with a letter modifier, e.g., 30A, 30B. The openings 24 may be permanently opened ends of the lift box 18, for example. In other exemplary embodiments, without limitation, the openings 24 may be subsequently closed, such as after transportation to a final destination, during or after installation, combinations thereof, or the like. For example, the openings 24 may be closed by adding a plug, welding a cover plate thereon, combinations thereof, or the like. In still other exemplary embodiments, without limitation, the lift boxes 18 may include an enclosure mechanism, such as a spring-hinged door by way of non-limiting example. In this way, the openings 24 may be closed when not in use.

In exemplary embodiments, the units 10 are mounted in alignment such that the electronic display subassembly(ies) 12 face in a respective, common direction. For example, an electronic display subassembly 12A of a first unit 10A faces in a first direction D1 and an electronic display subassembly 12C of a second unit 10B faces in the first direction D1. Where the units 10 employ multiple electronic display subassemblies 12, each may face in a same, common direction. For example, a second electronic display 12B of the first unit 10A and a second electronic display 12D of the second unit 10B may each face in a second common direction D2. The second common direction D2 may oppose the first common direction D1 in exemplary embodiments, without limitation.

In this fashion, lift boxes 18A, 18B of the multiple units 10A, 10B may be substantially (e.g., within 20%) aligned, such as with their openings 24A, 24B facing and/or longitudinal axes extending in a third common direction D3. The third common direction D3 may be at least substantially (e.g., within 20%) perpendicular to D1 and D2 in exemplary embodiments, without limitation. Forks 30A, 30B of the intermediary transportation vehicle 28 may be inserted into the lift boxes 18A, 18B of the units 10A, 10B respectively, such as to lift, move, or otherwise manipulate and/or transport the units 10. The intermediary transportation vehicle 28 may comprise, for example without limitation, a pallet jack, forklift, combinations thereof, or the like. The intermediary transportation vehicle 28 may be manually operable and/or at least partially autonomous.

For example, the forks 30 may move in substantially a direction D4, which may at least substantially (e.g., within 20%) oppose the direction D3 for insertion into the lift boxes 18, and in the direction D3 to be removed from the lift boxes 18.

The lift boxes 18 may have a depth (e.g., along longitudinal axis extends into the units 10) sufficient to accommodate all, at least a majority, and/or substantially all (e.g., >80%) of the forks of the intermediary transportation vehicle 28. The lift boxes 18 may be sized to provide tolerances for various size and/or shape forks, lateral or other movement of the intermediary transportation vehicle 28, combinations thereof, or the like.

The lift boxes 18 may be sized according to one or more generally accepted standards for forks of intermediary transportation vehicle 28. Alternatively, or additionally, the lift boxes 18 may be sized to extend all, or substantially (e.g., >80%) all of a length of the bases 16.

The bases 16, such as with the lift boxes 18, may be used to secure the units 10 to the common surface 32, such as for packaging and/or transportation, and/or a ground or other surface for final installation, such as but not limited to a sidewalk. For example, without limitation, the bases 16, such as the platforms 20, may comprise one or more apertures for receiving bolts or other fasteners. In exemplary embodiments, without limitation, four apertures for four bolts may be provided at substantially four corners of the generally rectangular shaped platform 20. However, various number and/or arrangement of apertures may be utilized for various types of fasteners in various size and/or shape platforms 20 or other base 16 components. The lift boxes 18 may be integrated with the units 10. For example, without limitation, the lift boxes 18 may provide part of the structure 14 and/or bases 16 for the units 10. The lift boxes 18 may remain with the units 10 when installed. The lift boxes 18 may serve to at least partially elevate the electronic display subassemblies 12. In these ways, the lift boxes 18 may serve multiple purposes.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A display assembly with an incorporated lift box for a fork of a forklift or pallet jack, said display assembly comprising:

one or more electronic display subassemblies, each comprising a cover layer and an electronic display layer located rearward of the cover layer; and a common structure supporting the one or more electronic display subassemblies and extending, at least in part, below the one or more electronic display subassemblies to a base, said common structure defining, at least in part, the lift box in the base thereof;

wherein the lift box forms a load-bearing portion of the common structure and at least partially elevates the one or more electronic display subassemblies above a ground surface.

2. The display assembly of claim 1 wherein:

the cover layer of each of the one or more electronic display subassemblies faces in a respective direction;

a longitudinal axis of the lift box extends in a direction which is at least substantially perpendicular to the respective direction of each of the one or more electronic display subassemblies; and said lift box comprises a cuboid shaped void which is open on a side facing at least substantially perpendicular to the respective direction.

3. The display assembly of claim 1 wherein:

the common structure comprises a platform forming part of the base and defining, at least in part, a lower surface of the lift box.

4. The display assembly of claim 3 wherein:

the common structure comprises feet extending from a lower surface of the platform.

5. The display assembly of claim 3 wherein:

the common structure comprises apertures provided in the platform outside of a footprint of the lift box for receiving fasteners for mounting the display assembly.

6. The display assembly of claim 3 wherein:

the common structure comprises feet extending from a lower surface of the platform for resting on a surface when the display assembly is installed or transported; and the common structure comprises apertures provided in the platform outside of a footprint of the lift box for receiving fasteners for mounting the display assembly to the surface when the display assembly is installed or transported.

7. The display assembly of claim 1 wherein:

the lift box extends at least a majority of a length of the base; and the lift box is configured to accept all, or substantially all, of the fork of the forklift and/or pallet jack.

8. The display assembly of claim 1 wherein:

each of the one or more electronic display subassemblies comprise a directly backlit liquid crystal type electronic display.

9. The display assembly of claim 1 further comprising:

additional equipment connected to the common structure, said additional equipment comprising electric vehicle charging equipment and at least one item of equipment for operating the one or more electronic display subassemblies.

10. The display assembly of claim 1 wherein:

the one or more electronic display subassemblies comprises a first electronic display subassembly and a second electronic display subassembly, each connected to the common structure and facing in opposing directions.

11. The display assembly of claim 10 wherein:

the cover layer of each of the one or more electronic display subassemblies faces in a respective direction;

a longitudinal axis of the lift box extends in a direction which is at least substantially perpendicular to the respective direction of each of the one or more electronic display subassemblies; and said lift box comprises a cuboid shaped void which is open on a side facing at least substantially perpendicular to the respective direction of each of the one or more electronic display subassemblies.

12. The display assembly of claim 1 wherein:

the lift box is integrally formed with the common structure.

13. The display assembly of claim 1 further comprising:

an open, pass-through area formed by the common structure below the one or more electronic display subassemblies and above the lift box, the open pass-through area being unobstructed to permit visual sightlines through the display assembly.

14. The display assembly of claim 1 wherein:

each of the one or more electronic display subassemblies comprises one or more airflow pathways, one or more fans located along said one or more airflow pathways, and one or more sensors located along the one or more airflow pathways.

15. A system for transporting multiple display assemblies together, each having an incorporated lift box, said system comprising:

a first display assembly and a second display assembly, each comprising:

an electronic display subassembly comprising a cover layer facing in a first respective direction and an electronic display layer located rearward of the cover layer; and a common structure extending, at least in part, below the electronic display subassembly to a base for supporting the display assembly, said common structure defining, at least in part, the lift box in the base thereof, wherein a longitudinal axis of the lift box extends in a second respective direction which is at least substantially perpendicular to the first respective direction.

16. The system of claim 15 further comprising:

a common surface, where the first and second display assembly are mounted to the common surface in an arrangement such that each of the lift boxes accepts one of the forks of a forklift or pallet jack, and such that the lift boxes collectively accept the forks of the forklift or pallet jack, wherein:

the first and second display assembly are mounted to the common surface such that an open end of the lift box of the first display assembly and an open end of the lift box of the second display assembly face in at least substantially a same direction; and the first and second display assembly are spaced apart from one another at the common surface such that the open end of each of the lift boxes are arranged to accept the forks of the forklift and/or pallet jack.

17. A method for transporting display assemblies together using the system of claim 16, said method comprising:

extending forks of a forklift or pallet jack into an open end of the lift boxes of the first and second display assembly, where the open end of said lift box of each of the first and second display assembly each face in an at least substantially same direction;

operating the forklift or pallet jack to raise the first and second display assembly together for movement to a new location;

moving the first and second display assembly together to said new location; and operating the forklift or pallet jack to lower the first and second display assembly together at said new location.

18. A display assembly with an incorporated lift box for a fork of a forklift or pallet jack, said display assembly comprising:

a first electronic display subassembly comprising a cover layer facing in a first direction and an electronic display layer located rearward of the cover layer;

a second electronic display subassembly comprising a cover layer and an electronic display layer, each facing in a third direction at least substantially opposite the first direction; and a common structure connected to the first and second electronic display subassembly, extending, at least in part, below the first and second electronic display subassembly and comprising and/or forming the lift box in a base thereof, wherein a longitudinal axis of the lift box extends in a second direction which is at least substantially perpendicular to the first direction and the third direction.

* * * * *